United States Patent [19]
Bell et al.

[11] 4,074,491
[45] Feb. 21, 1978

[54] CLIP SHOCK MOUNT

[75] Inventors: Graham Elsworth Bell, Renton; Alden Bernard Winters, Seattle, both of Wash.

[73] Assignee: The Boeing Company, Seattle, Wash.

[21] Appl. No.: 735,655

[22] Filed: Oct. 26, 1976

[51] Int. Cl.² .............................................. E04B 1/62
[52] U.S. Cl. ...................................... 52/394; 52/400; 52/511; 52/741; 151/41.75
[58] Field of Search ................ 52/403, 509, 511, 506, 52/394, 400, 624, 741; 248/15, 21; 85/1.5 P, 50 R; 151/41.75

[56] References Cited
U.S. PATENT DOCUMENTS

| | | | |
|---|---|---|---|
| 2,224,186 | 12/1940 | Henri-Lobourdette | 52/400 X |
| 3,009,499 | 11/1961 | Weihe | 151/41.75 |
| 3,223,374 | 12/1965 | Butler et al. | 248/15 X |

Primary Examiner—Ernest R. Purser
Assistant Examiner—Carl D. Friedman
Attorney, Agent, or Firm—H. Gus Hartmann; Bernard A. Donahue

[57] ABSTRACT

A metal U-shaped spring clip having a resilient material moulded to the interior surface thereof. Each of the legs of the U has an aperture and the apertures are aligned for receiving a bolt therethrough. The resilient material is integrally moulded into a bushing within each of the apertures; and this bushing includes a projection or lip of resilient material which, when the clip is slipped onto a part having a mating hole, allows the lip portion of the apertured legs to extend into the opening, thereby forming an interlocking engagement with the hole for retension of the clip. A second embodiment includes a captive nut on one of the legs of the U for retaining a bolt.

8 Claims, 10 Drawing Figures

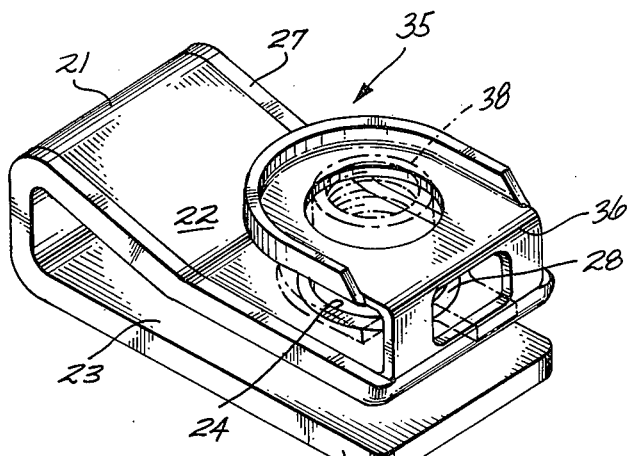
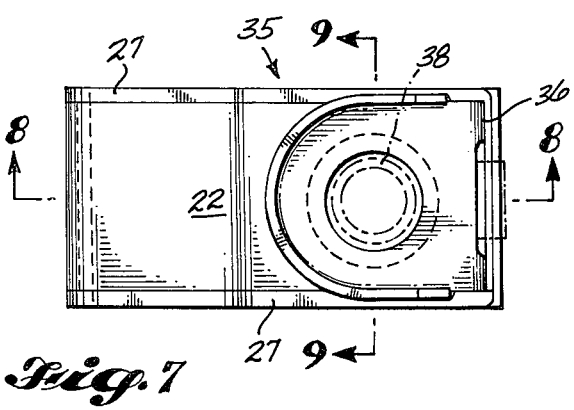
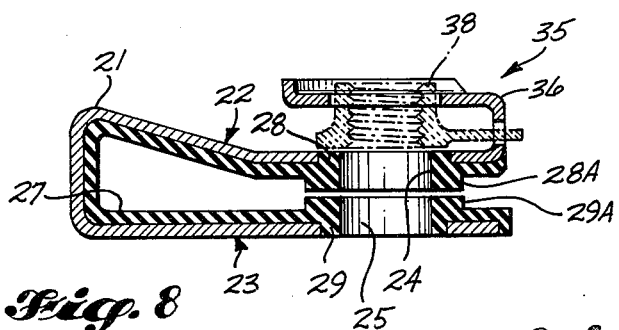
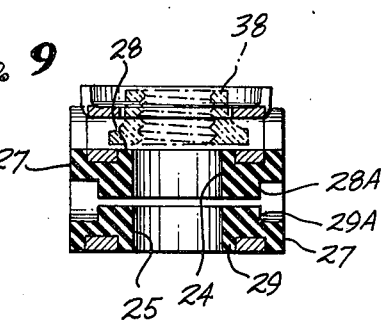
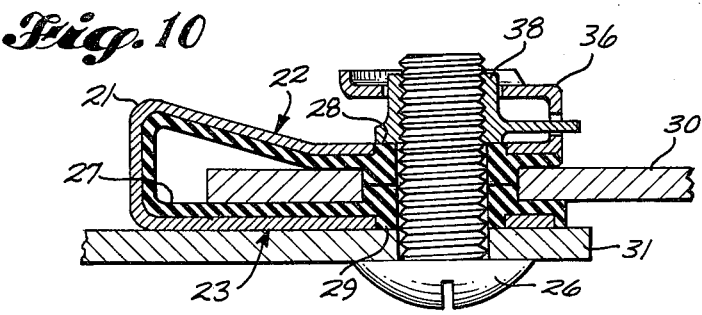

CLIP SHOCK MOUNT

BACKGROUND OF THE INVENTION

For sound proofing an aircraft passenger compartment the interior trim panels, such as the ceiling panels, have to be acoustically isolated from aircraft primary structure. Also, these trim panels have to be quickly and easily removable in order to gain access to control cables, wiring, equipment, etc. for ease of maintenance and repair with a minimum of aircraft down time.

The present known devices for attaching aircraft interior trim panels to frame structure for vibration or acoustic isolation, are generally termed "isolator mounts" and comprise a metal base plate in combination with a moulded rubber boss. The metal base plate is mechanically fastened, generally by rivets, to the aircraft frame structure. A support bracket is attached to the resilient boss of the shock mount for acoustic isolation, and then the trim panel is fastened to the support bracket.

Another presently known device for attaching aircraft interior trim panels to frame structure comprises an assembly of rubber parts for building up an acoustic isolator mount. The trim panels are manufactured by a compression moulding glass fiber process which results in their being slightly heavier than standard, and therefore requiring more rigidity in the support system. So, the isolation was moved to the frame. i.e., the support brackets were rigidly attached to frame structure and the isolation was relocated to between the support bracket and the panel by an interposed assembly of rubber pieces. From a production installation standpoint, this build-up of rubber parts for destroying any metal-to-metal contact was time consuming and costly; also, it was too easy to misplace one of the parts of the rubber build-up.

SUMMARY OF THE INVENTION

The invention relates to a clip shock mount for attaching trim panels, such as wall and ceiling panels, to the interior of an aircraft passenger compartment, so as to provide acoustic and vibration isolation between the trim panels and frame structure of the aircraft. More particularly, the invention is directed to the construction of the resilient portion of the clip and its self-retaining mounting feature; and also for providing a universal attachment mode.

Acoustic and vibration transmission is like an electrical circuit and in order to isolate the source, the circuit has to be shorted out. Therefore, for the clip shock mount to have the desired acoustic isolation characteristic, an elastomer is moulded to the inner surface of the U-shaped metal base; and each leg of the U has an aperture within which a resilient bushing is also integrally moulded. The clip shock mount is normally clipped onto a frame member having a hole drilled therein for receiving the resilient bushing of the apertured legs and thereby retains the clip in position. The resilient bushing serves to isolate the shank of a bolt fastener which is inserted for attachment of the trim panels to the frame structure so that there is no metal-to-metal contact for the transmittal of noise and vibration.

One of the objects of the invention is to simplify the installation of compression moulded side-wall and ceiling trim panels in aircraft interiors by combining the features of a clip-nut mount with an isolator mount.

An advantage of the invention over known shock mounts, is that it can be easily slipped onto a part without any prior riveted fastening of a metal base, which is necessary for the generally known shock mounts.

Another advantage of the invention is that once it is slipped onto a part having a receiving aperture or slot for the lip portion of the clip, it is self-retaining.

Another advantage of the invention is that it is also useful for corrosion protection, where two dissimilar metal parts are to be fastened together, by preventing metal-to-metal contact between the parts.

Another advantage of the invention is that it can be installed onto a part having a slot or oversize hole thereby providing a floating feature for accommodating a tolerance build-up.

Another advantage of the invention is that it is also useful for thermal isolation where it is required to minimize a flow of heat in either direction between the parts.

BRIEF DESCRIPTION OF THE DRAWINGS

FIG. 6 is a perspective view illustrating a second embodiment of the invention wherein the clip shock mount includes a captive nut;

FIG. 7 is a plan view of FIG. 6;

FIG. 8 is a side elevation view, in section, taken along the line 8—8 of FIG. 7;

FIG. 9 is a cross-sectional view taken along the line 9—9 of FIG. 7;

FIG. 10 is a side elevation view, in section, showing the second embodiment of the clip shock mount in an installation assembly.

DETAILED DESCRIPTION OF THE DRAWINGS

FIGS. 1–5 show a clip shock mount of the first embodiment of the invention which is primarily directed to solving the acoustic and vibration isolation problem between the ceiling trim panels and their attachment to frame support structure in an aircraft passenger compartment; however, it is to be understood that the invention could be utilized in other applications.

Figure 1:
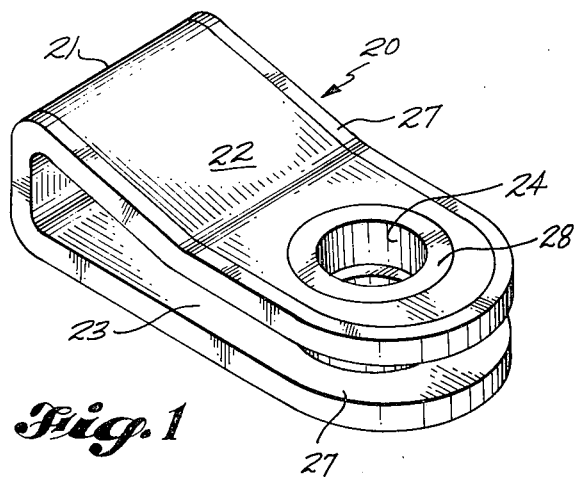
FIG. 1 is a perspective view of the clip shock mount embodying the invention.
Figure 2:
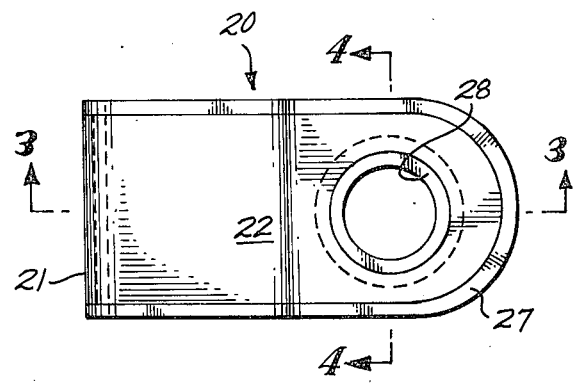
FIG. 2 is a plan view of FIG. 1.
Figure 3:
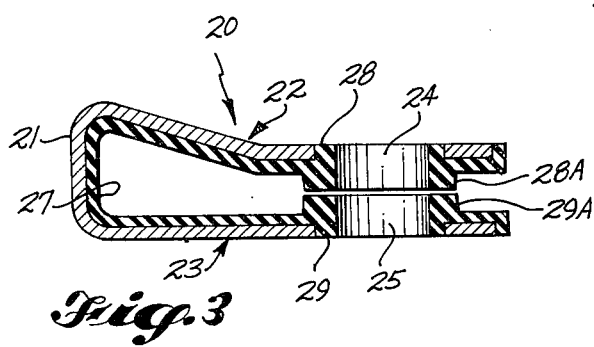
FIG. 3 is a side elevation view, in section, taken along the line 3—3 of FIG. 2.
Figure 4:
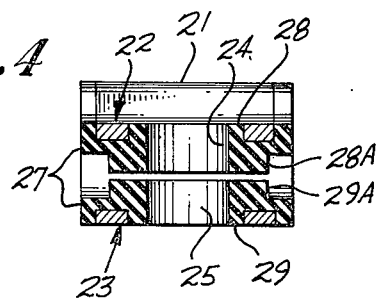
FIG. 4 is a cross-sectional view taken along the line 4—4 of FIG. 2.
Figure 5:
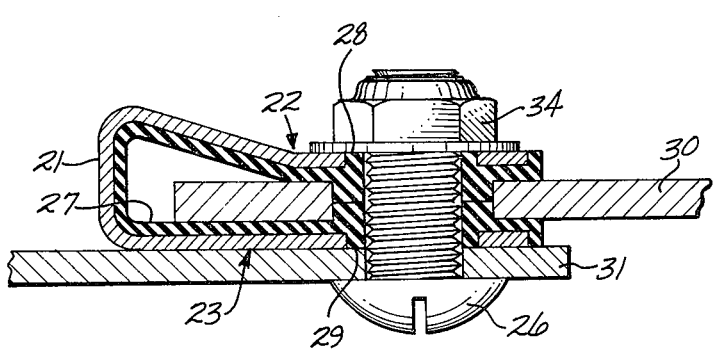
FIG. 5 is a side elevation view, in section, showing the clip shock mount installation with fastener.

FIG. 1 is a perspective view of the clip shock mount 20 comprising a spring steel strip or metal band 21 which is folded or overlapped to form a U-shaped spring clip. The free ends of the metal band or the two laterally extending adjacent legs 22, 23 of the U, are provided with apertures 24, 25, which when the clip is mounted onto a part as shown in FIG. 5 an assembly view, the apertures are adapted to be vertically aligned for the insertion of a bolt 26 or a screw therethrough. The space or distance between the open ends or legs of the U, is approximately equivalent to the thickness of the part to which the clip is attached; and the spreading of the legs 22, 23 or the spring action, permits the clip to be slipped onto parts of different thicknesses for a more universal utilization thereof.

The inner surface of the U-shaped metal strap has an elastomeric material 27 such as neoprene, polyurethane, etc., preferably process moulded thereto, such that the material extends around and over the edges of the metal. The elastomeric material is also integrally form moulded into a resilient bushing 28, 29, within each of the apertures in the legs of the U, with a projection 28A, 29A, or lip of resilient material extending towards the inner portion of the clip. As shown in the side elevational, cross sectional, assembly view of FIG. 5, the resilient bushings 28, 29, prevent the shank of the bolt from making metal contact with metal band 21 of the clip, when the assembly is bolted together during installation of the ceiling trim panel 31; and thus prevents the generation and transmission of noise.

It is important that the elastomeric material 27 be permanently secured to the metal band 21, so as to become integral therewith, not only for simplification of the installation process by decreasing the number of parts making up the mounting assembly, but also from the standpoint of slippage between the elastomeric material 27 and the metal band 21 due to vibration, with the possibility of generating noise. The permanent adherence or integral bonding between the metal and the elastomer may be accomplished by an adhesive or bonding process.

The generally known shock isolator mounts used for attaching passenger compartment trim panels to aircraft structure, generally have to be riveted or rigidly fastened to frame structure; whereas, the clip shock mount 20 or the clip nut shock mount 35 in FIGS. 6-10 of the present invention quickly and easily slips onto or off of a part without necessitating the attachment or removal of fasteners.

As shown in FIG. 5, the apertured legs 22, 23 of the U-shaped clip, when properly positioned onto the frame member 30 or support structure, have their shock insulated apertures 24, 25, in registry with those of the frame member, and when properly aligned in the opening of the frame member, the lips 28A, 29A of the respective resilient bushings 28, 29, are inserted into frame opening; and the outer surface of the resilient lips 28A, 29A, bear against the inner surface of the frame opening which permits the legs 22, 23, of the clip to be interlocked and retained in position; thereby preventing the bolt 26 from contacting the frame 30. This self-retaining feature of the invention, is important from a time saving standpoint, e.g. during the removal of the trim panels 31 for access to devices behind the panels for inspection and maintenance. When the clip shock mount 20 is indexed in position on the frame member 30, the trim panel 31 is held in position and a bolt 26 is inserted through the aligned apertures, and the assembly is fastened together by a lock nut 34. It should be noted, that the purpose of this lock nut 34, is to keep the bolt from vibrating loose without excessively tightening the assembly which would compress the abutting resilient lips or collars 28A, 29A, of the clip apertures. As will be noted from a comparison between FIGS. 4 and 5, the moulded bushing in the apertures of the clip, are in a non-compressed, abutment relation when the assembly is properly fastened together.

For limiting the compressive force applied to the assembled parts through the tightening down of the fastening means, the type of bolt could be changed from that shown, to one having an un-threaded shank portion (not shown) of the approximate diameter for mated insertion into the aperture bushings and with a reduced diameter threaded portion adjacent thereto, such that a shoulder is formed therebetween for stopping the further tightening movement of the nut and compression of the resilient material.

Merely coating a resilient material 27 onto the metal base 21 of the clip 20 will not produce a satisfactory slip shock mount, because in order to get the resilient material 27 to the desired shape and with an integral resilient lip 28A, 29A, about the apertures 28, 29, the material has to be moulded on; and without the lip 28A, 29A, on there, there will be no registration with the apertured receiving part 30 or an abutment relationship of the resilient collars 28A, 29A, when the assembly is properly tightened down. Excessive tightening and compression of the resilient material would destroy the acoustic isolation characteristics between the trim panel 31 and frame member 30, because the moulded shape of the resilient material has to be maintained in order for the density of the resilient to remain soft enough for the retension of its acoustic and vibration isolation characteristics. For effectively shorting out the transmission of acoustic noise and vibration thereby reducing the noise level in the passenger compartment of the airplane, the resilient material on the inner surface of the clip and within the apertures thereof, must isolate the ceiling and wall trim panels from the shank of the bolt fasteners to avoid metal-to-metal contact with support structure.

Where the fastening together of parts presents a dissimilar metal corrosion problem, the insertion therebetween of the clip shock mount of the present invention, could also solve that problem by preventing metal-to-metal contact between the parts. Although, a corrosion inhibitive coating applied onto the two dissimilar metal parts to be joined would aid in alleviating the problem, there would still remain the problem of corrosion between the metal bolt fastener and the parts to be joined, which the insertion of the clip shock mount therebetween could solve.

FIGS. 6 to 10 show the second embodiment of the invention, a clip-nut shock mount 35 which further simplifies the installation of compression moulded sidewall and ceiling trim panels in airplane interiors, by combining the features of a clip-nut mount with those of a shock isolator mount.

The clip-nut shock mount 34 shown in FIGS. 6 to 10 is somewhat similar to the clip shock mount 20 previously described and shown in FIGS. 1 to 5; therefore, those elements which are similar in appearance and function, have been give like reference numerals.

As shown in the perspective view of FIG. 6, the clip-nut shock mount 35 has one of its laterally extending legs 22 with a return bent end 36 which embraces a threaded sleeve or nut 38 for receiving a bolt 26 or screw. This captive nut has its threaded opening in alignment with the apertures in the laterally extending legs of the U.

From the cross sectional and side elevational view shown in FIG. 10, it can be seen that when the parts are properly assembled and fastened together, the trim panel 31 is effectively isolated from metal-to-metal contact with the frame support structure 30 by the clip-nut shock mount 35. Also, it should be noted that the captive nut 38 retains the bolt 26 centered and aligned with the axis of the apertures 24, 25, in the clip so that the shank of the bolt is not misaligned during fastening nor permitted to move out of alignment after fastening through vibration or other causes which could result in excessive compression of the walls of the resilient bushings 28, 29, and wear of the bushing, causing vibration transfer or metal-to-metal contact noise between the shank of the bolt and the frame support structure 30.

The captive nut feature is a very useful thing to the design engineer and to the production assembly worker, in that it can be easily slipped onto the part and retains itself in position without any riveting or fastening of a metal base plate, as is required for attaching the generally known shock isolator mounts. Also, it is cheaper to install than a nut-plate because no riveting nor fastening time is required. Further, when it is slipped onto a part having an oversized hole or a slotted opening, the clip can be made to float or slide within the slot, where this type of motion is required or where adjustability is required due to manufacturing tolerances.

What is claimed is:

1. A clip shock mount, comprising: a U-shaped metal band having a pair of legs forming part of the U-shape; the free end of each of the legs having an aperture and said apertures being in alignment; a resilient material fixedly attached to the inner surface of the U-shaped metal band; and said resilient material having an integrally formed bushing, within each of the apertures, with a collar of resilient material extending inwards of the U-shaped metal band.

2. A clip shock mount as set forth in claim 1, including: a captive nut on one of the legs of the U-shaped metal band for retaining a bolt.

3. A clip shock mount for vibration dampening between two members, said clip comprising: a U-shaped metal band having a pair of adjacently extending legs forming a part of the U-shape; the free end of each of the legs having an aperture and said apertures being in alignment; a resilient material secured to the inner surface of the U-shaped metal band and integrally formed into a bushing within each of said apertures; said resilient bushing having a collar portion which projects inwardly from the adjacently extending legs and forms a mating insertion with a receiving opening in a first member for retension of the clip shock mount when the first member is inserted between said legs; said resilient said resilient bushing and collar isolating the shank of a bolt fastener from direct contact with said first member when said bolt is inserted therethrough, for attachment of a second member thereto, thereby effectively shorting out the transmission of acoustic noise and vibration between the first and second members.

4. A clip shock mount as set forth in claim 3, including: a captive nut on one of the legs of the U-shaped metal band for retaining a bolt.

5. Apparatus for attaching interior trim panels to the frame structure in an airplane passenger compartment for vibration dampening and acoustically isolating the panels from aircraft primary structure for noise suppression, comprising: a support bracket having a receiving aperture and mechanically fastened to frame structure in the passenger compartment of the airplane; a clip shock mount comprising, a U-shaped metal band having a pair of adjacently extending legs forming a part of the U-shape, the free end of each of the legs having an aperture and said apertures being in alignment for the insertion of a bolt therethrough, a resilient material form moulded to the inner surface of the U-shaped metal band and forming a bushing within each of said apertures, and said resilient bushing having a collar portion which projects inwardly from the adjacently extending legs; said clip shock mount being mounted onto the support bracket such that the collar portion of the resilient bushing forms a mating insertion with the receiving aperture of the support bracket for retension of the clip shock mount when the support bracket is inserted between said legs; the interior trim panel having an aperture and being positioned onto said clip shock mount such that the trim panel aperture is in alignment with those of the clip shock mount and the support bracket; a bolt inserted through said aligned apertures of the trim panel, clip shock mount and support bracket; a lock-nut for threadedly engaging the bolt to fasten the assembly together; whereby the resilient bushing and collar isolates the shank of the bolt from direct contact with the support bracket and effectively shorts out the transmission of acoustic noise and vibration between the interior trim panel and the frame structure of the airplane.

6. The apparatus as set forth in claim 5 wherein the lock-nut is captively mounted to one of the legs of the U-shaped metal band for retaining the shank of a bolt in concentric alignment with the resilient bushing in the leg apertures when the assembly of parts is bolted together.

7. A method for attaching interior trim panels having mounting apertures to frame structure in an airplane passenger compartment for vibration isolation and acoustic noise suppression, comprising the steps of: mechanically fastening a support bracket, having a receiving opening, to the frame structure in the passenger compartment of the airplane; sliding the spread apertured legs of a U-shaped spring clip, having a form moulded coating of elastomeric material on its inner surface and within each of the leg apertures, onto the support bracket; forming a mating insertion of a resilient collar on the legs of the clip, which is a projection of the resilient material within the leg apertures that extends towards the interior of the U-shape, with the receiving opening in the support bracket for retension of the clip shock mount; aligning the trim panel mounting aperture with those of the clip shock mount and the frame member; inserting a bolt through the aligned apertures; fastening the assembly together with a lock-nut and limiting the compression of the resilient material so as not to destroy its acoustic and vibration isolation characteristics; and whereby the resilient material on the inner surface of the clip and within its apertures, isolates the bolt and trim panel from the frame structure so as to effectively short out the transmission of acoustic noise and vibration therebetween for reducing the noise level in the passenger compartment of the airplane.

8. The method as set forth in claim 7 further including the step of; captively mounting the lock-nut on one of the legs of the U-shaped metal band for retaining the shank of a bolt in concentric alignment with the resilient bushing in the leg apertures when the assembly of parts is bolted together.

* * * * *